Patented Dec. 23, 1941

2,267,620

UNITED STATES PATENT OFFICE 2,267,620

PASTE FOR TEXTILE PRINTING

Norman S. Cassel, Ridgewood, N. J., assignor to Interchemical Corporation, New York, N. Y., a corporation of Ohio No Drawing. Application January 19, 1940, Serial No. 314,625

6 Claims. (Cl. 8—69)

This invention relates to the printing of textile fabrics, and has particular reference to a method of simultaneously printing and discharging previously dyed fabrics, by the use of emulsions, the inner phases of which comprise aqueous solutions of dye discharge agents, and the external phases of which comprise water-immiscible liquids which are sufficiently film-forming to produce satisfactory emulsions.

Printing of textile fabrics is conventionally accomplished by applying water pastes of dyestuffs, with water soluble thickeners to render the compositions printable. The dyes are applied in solution in water, and fixed on the fabric in a variety of ways; and the fabric is then washed to remove the thickener, stretched and dried.

When printing is to be done on previously dyed cloth, it is conventional practice to remove the color on the spots to be printed with a bleaching agent, commonly known as a discharge agent. Since these agents, like the printing pastes, must be applied in water solution, the discharging of the color does not complicate the printing operation.

In my copending application, Serial Number 215,585, filed June 24, 1938, now Patent No. 2,202,283, issued May 28, 1940, I have disclosed a method of printing textile fabrics in which a solution of a dyestuff in water, generally in the undeveloped state, is emulsified as the inner phase of an emulsion in which the continuous phase is a liquid which is sufficiently film-forming to produce a satisfactory emulsion, and preferably comprising a lacquer, i. e., a solution of a film-forming solute in a volatile organic solvent—to give a paste of printing consistency, and the resulting paste is then printed onto the fabric. The enveloping of the dyestuff by the lacquer results in a control of deposition of the color, not heretofore obtainable with conventional dye pastes.

I have now discovered that simultaneous printing and discharging may be obtained by emulsifying a discharge agent into the interior phase of an emulsion in which the external liquid is resistant to the action of the discharge agent.

The effect may be obtained with emulsions of a dyestuff and dyestuff components in an uncolored lacquer, in which case the discharge agent is dissolved with the dyestuff and the dyestuff must be resistant to the action of the discharge agent. It may also be obtained in compositions where the lacquer phase is pigmented or otherwise colored, in which case the solution of the discharge agent may be emulsified into the colored lacquer, which should contain a film-forming material which acts both as a binder for the pigment and to produce an emulsion.

In order to get a paste of printing consistency, the aqueous phase should ordinarily be at least 20% of the total paste. Larger amounts are used by preference, of the order of 40 to 60%.

Typical examples of my invention are the following:

Example 1

A solution of Rongalite (formaldehyde sodium sulf-oxalate) is emulsified in an alkyd resin solution in which has previously been dispersed a pigment.

| | Parts |
|---|---|
| A dispersion of Monastral Blue (copper phthalocyanine blue) | 5 |
| in | |
| Alkyd resin solution | 15 |
| is dissolved in | |
| Xylol | 30 |
| and | |
| 20% sol. Rongalite in water | 50 |
| is emulsified into the lacquer. | |

The alkyl resin solution is made by reacting 148 parts phthalic anhydride, 110 parts C. P. glycerol, and 125 parts castor oil fatty acids at 230° C. in the presence of carbon dioxide until the acid number is about 8, and then reducing to 50% non-volatile with xylol.

This paste may be applied over a previously dyed dischargeable ground, and gives a sharp print, together with an effective discharge. The excess discharge agent is preferably washed out of the fabric after passing through an ager.

Example 2

A solution of Formopon (formaldehyde zinc sulf-oxalate) is emulsified in an alkyd resin-urea formaldehyde resin lacquer in which Zinc White or titanium oxide has been dispersed.

| | Parts |
|---|---|
| The alkyl resin solution of Example 1 | 15 |
| is mixed with | |
| Urea formaldehyde resin solution (50% solids in 30 butanol-20 xylol) | 5 |
| and | |
| Zinc White | 15 |
| is dispersed therein. | |
| Xylol | 25 |
| is added, and | |
| 20% sol. of Formopon in water | 40 |
| is emulsified into the lacquer. | |

This is a typical example of discharge printing to get a white. It washes out easily, as contrasted to typical prior art pastes of this type, where the albumen used to hold the white in place prevents effective removal of the excess discharge agent.

Example 3

A solution of sodium hydrosulfite is emulsified in an ethyl cellulose lacquer bearing a pigment such as iron oxide red.

|  | Parts |
|---|---|
| A dispersion of ethyl cellulose (medium viscosity) | 5 |
| and |  |
| Iron oxide | 5 |
| is dissolved in |  |
| Butanol | 5 |
| Xylol | 10 |
| Solvesso #3 (hydrogenated petroleum naphtha—B. P. 175–210° C.) | 25 |
| and |  |
| 25% solution of sodium hydrosulfite | 50 | is emulsified into the lacquer.

Example 4

|  | Parts |
|---|---|
| Ethyl cellulose (250 centipoise viscosity) | 0.8 |
| Pine oil | 2.0 |
| Xylol | 6.2 |
| Solvesso #3 | 25.0 |
| A solution of |  |
| Methylene blue | 2.0 |
| dissolved in |  |
| Water | 18.0 |
| 40% sodium sulf-oxalate solution | 46.0 | is then emulsified into the lacquer.

The methylene blue has the composition:

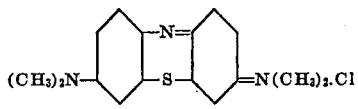

Example 5

|  | Parts |
|---|---|
| 241 centipose ethyl cellulose | .40 |
| Pine oil | .21 |
| 302 Xylol | 12.09 |
| 304 Solvesso #2 | 12.30 |
| In to this lacquer is stirred— |  |
| Ponsol Blue G. D. double paste (Du Pont-Schultz 1234) | 10.00 |
| Glyceine A (General Dyestuffs Corp.) | 4.00 |
| Glycerine | 6.00 |
| Potash | 9.00 |
| Rongalite (formaldehyde sodium sulfoxalate | 8.00 |
| Water | 38.00 |

Example 6

|  | Parts |
|---|---|
| A solution of |  |
| Sodium chlorate | 100 |
| in |  |
| Water | 53 |
| is added to a solution of |  |
| Tartaric acid | 44 |
| and |  |
| Citric acid | 44 |
| in |  |
| Water | 68 |
| A hot solution (180° F.) of |  |
| Potassium ferrocyanide | 25 |
| in |  |
| Water | 66 | is then added to the mixture, and the resultant mixture cooled to 95° F. It is then stirred into the lacquer phase of Example 5, in the ratio of 63 parts of discharge solution to 37 parts of lacquer, to produce a discharge printing paste which could be used for sulfur colors. The emulsion is relatively unstable, and should be mixed before use.

A cotton, rayon, silk or wool fabric which has been dyed with a dischargeable dyestuff may be printed with any of the above marking compositions in which a discharge solution has been emulsified, dried and then passed through an ager (moist steam at 212°) for 5 to 15 minutes. Under these conditions the discharge agent bleaches the ground dyestuff, leaving the color of the paste undiluted. Soaping to remove excess discharge agents may follow if necessary, depending on delicacy of shade. Where light shade grounds are used it is not necessary to age, discharge being achieved by the heat of drying.

Due to the superior printing qualities of the above marking compositions, a delicacy of discharge printing heretofore impossible is achieved.

Any pigments and dyestuffs which give the desired permanence on the fabric may be used, provided they are not affected by the discharge agent chosen. The materials comprising the external phase must be chosen to be resultant to the chemical action of the bleaching agent, and to be resistant to their physical action in the emulsion. Where the bleaching agent is strongly alkaline, ethyl cellulose is a preferred solute; and where the agent is strongly acid, alkyd resins are highly satisfactory. However, other materials which are sufficiently film-forming when dissolved in volatile solvents to give water immiscible lacquers can also be used, if they are not attacked by the bleaching agent employed so rapidly that the emulsion breaks down. Thus, I have successfully used milled rubber and similar products (including chloroprene and isobutylene polymers and rubber derivatives), synthetic resins such as those of the phenol-aldehyde, maleic adducts, cumarone and polymerized olefine type, natural resins such as rosin derivatives, dammar and copals, various cellulose ethers and esters, and bodied fatty oils.

The discharge agent must obviously be one which will discharge the dye on the fabric to be printed. Desirable agents for the purpose include Rongalite (formaldehyde sodium sulf-oxalate), Formopon (formaldehyde zinc sulf-oxalate), sodium hydrosulfite, and hydrosulfite sulf-oxalate, other types of reducing discharges, in particular the new very powerful organic reducing discharges of the quaternary ammonium type, and various oxidizing discharge agents such as potassium ferricyanide, chlorates and the like.

The discharge agent and reduced dye should preferably be washed out of the fabric, but it is possible, where dyeing is light, to remove excess merely by heating.

Modifications of the invention can obviously be made without departing from its scope, which is defined in the claims.

This application is a continuation in part of my copending application, Serial Number 284,211, filed July 13, 1939.

I claim:

1. A textile printing paste comprising an emulsion the outer phase of which comprises a water immiscible solution of a film-forming solute in a volatile organic solvent, and the inner phase of which is an aqueous solution of a textile dye discharge agent.

2. A textile printing paste comprising an emulsion the outer phase of which comprises a water immiscible solution of a film-forming solute in a volatile organic solvent with pigment dispersed therein, and the inner phase of which is an aqueous solution of a textile dye discharge agent.

3. A textile printing paste comprising an emulsion the outer phase of which comprises a water immiscible solution of a film-forming solute in a volatile organic solvent, and the inner phase of which is an aqueous solution of a textile dye discharge agent and a dyestuff component which is resistant to the action of the discharge agent.

4. A textile printing paste comprising an emulsion the outer phase of which comprises a water immiscible solution of a film-forming solute in a volatile organic solvent, and the inner phase of which is an aqueous solution of a textile dye discharge agent, the aqueous phase constituting 20% or more of the emulsion.

5. A textile printing paste comprising an emulsion the outer phase of which comprises a water immiscible solution of a film-forming solute in a volatile organic solvent with pigment dispersed therein, and the inner phase of which is an aqueous solution of a textile dye discharge agent, the aqueous phase constituting 20% or more of the emulsion.

6. A textile printing paste comprising an emulsion the outer phase of which comprises a water immiscible solution of a film-forming solute in a volatile organic solvent, and the inner phase of which is an aqueous solution of a textile dye discharge agent and a dyestuff component which is resistant to the action of the discharge agent, the aqueous phase constituting 20% or more of the emulsion.

NORMAN S. CASSEL.